US011376917B2

(12) United States Patent
Simon et al.

(10) Patent No.: US 11,376,917 B2
(45) Date of Patent: Jul. 5, 2022

(54) OSCILLATING AXLE FOR A LIFTING DEVICE, LIFTING DEVICE COMPRISING SUCH AN AXLE AND CONTROL METHOD

(71) Applicant: HAULOTTE GROUP, L'Horme (FR)

(72) Inventors: Alexandre Simon, Saint-Etienne (FR); Rémy Cognet, La Grand Croix (FR)

(73) Assignee: HAULOTTE GROUP, L'Horme (FR)

( * ) Notice: Subject to any disclaimer, the term of this patent is extended or adjusted under 35 U.S.C. 154(b) by 0 days.

(21) Appl. No.: 17/009,217

(22) Filed: Sep. 1, 2020

(65) Prior Publication Data
US 2021/0061046 A1    Mar. 4, 2021

(30) Foreign Application Priority Data

Sep. 3, 2019  (FR) ...................................... 1909665

(51) Int. Cl.
*B60G 17/056*    (2006.01)
*B60G 9/02*    (2006.01)

(52) U.S. Cl.
CPC ........... *B60G 17/0565* (2013.01); *B60G 9/02* (2013.01); *B60G 2200/326* (2013.01);
(Continued)

(58) Field of Classification Search
CPC ............. B66F 9/07586; B60G 21/073; B60G 2400/51; B60G 2600/044; B60G 2400/50;
(Continued)

(56) References Cited

U.S. PATENT DOCUMENTS 4,152,004 A * 5/1979 Schroder ................... B60G 9/02
280/6.154
4,741,206 A * 5/1988 Ishiguro ............. B60G 17/0185
340/686.1

(Continued)

FOREIGN PATENT DOCUMENTS

CN    104528609    4/2015
EP    0 890 462    1/1999
(Continued)

OTHER PUBLICATIONS

Search Report of FR Application No. 1909665 dated May 15, 2020, 2 pages.

*Primary Examiner* — Paul N Dickson
*Assistant Examiner* — Maxwell L Meshaka
(74) *Attorney, Agent, or Firm* — Nixon & Vanderhye

(57) ABSTRACT

This oscillating axle (3) for a lifting device (1) comprises an axle bridge (5) at the ends of which are mounted two ground connection members (7), an oscillation axis (X3), a left jack (9) and a right jack (11), each jack (9, 11) having a rod (90, 110) in contact with the bridge (5) and a body (92, 112) fixed on a fixed part (13) of a chassis (2) of the lifting device (1), the body (92, 112) forming a chamber (94, 114) in which the rod (90, 110) moves. The axle comprises a hydraulic circuit (15) interconnecting the chambers (92, 112) of the left (9) and right (11) jacks, in which a fluid is present at a given pressure, making it possible to press the rods (90, 110) of the left jack (9) and of the right jack (11) against the bridge (5), and at least one solenoid valve (150, 152) on a branch (15A) of the hydraulic circuit (15) connected to the chamber (94) of the left jack (9), and at least one solenoid valve (154, 156) on a branch (15B) of the hydraulic circuit (15) connected to the chamber (114) of the right jack (11), wherein each of these solenoid valves (150, 152, 154, 156) may be positioned in an open position, in which fluid may flow freely,
(Continued)

and a closed position, in which the fluid is trapped in the chamber (94, 114) of the corresponding jack (9, 11). Each of the chambers (94, 114) of the left jack (9) and of the right jack (11) has a pressure sensor (23, 25) designed to measure the pressure of the fluid in each of the chambers (94, 114). Control means (21) are provided to detect a pressure in one of the chambers (94, 114) that is greater than a first threshold, and/or a differential between the pressures in each of the chambers (94, 114) that is greater than a second threshold, so as to detect the blocking of a solenoid valve (150, 152, 154, 156) in the closed position, and to initiate a safety procedure.

7 Claims, 3 Drawing Sheets

(52) U.S. Cl.
CPC .. *B60G 2202/413* (2013.01); *B60G 2204/421* (2013.01); *B60G 2400/50* (2013.01)

(58) Field of Classification Search
CPC ......... B60G 17/0185; B60G 2202/413; B60G 9/02; B60G 17/0565
See application file for complete search history.

(56) References Cited

U.S. PATENT DOCUMENTS

| | | | | |
|---|---|---|---|---|
| 5,447,331 A | * | 9/1995 | Barnhart | B60G 9/02 180/41 |
| 6,056,304 A | * | 5/2000 | Brambilla | B60G 9/02 180/358 |
| 6,131,918 A | * | 10/2000 | Chino | F16F 9/54 280/6.154 |
| 6,942,232 B1 | * | 9/2005 | McGhie | B60G 5/04 280/124.111 |
| 2020/0180386 A1 | * | 6/2020 | Tabata | B60G 21/0558 |
| 2021/0155068 A1 | * | 5/2021 | Stabel | B60G 17/0155 |

FOREIGN PATENT DOCUMENTS

| | | | | |
|---|---|---|---|---|
| EP | 1 414 733 | | 5/2004 | |
| GB | 2253820 A | * | 9/1992 | ........... B60G 17/018 |
| WO | 03/014002 | | 2/2003 | |

\* cited by examiner

OSCILLATING AXLE FOR A LIFTING DEVICE, LIFTING DEVICE COMPRISING SUCH AN AXLE AND CONTROL METHOD

This application claims priority to FR Patent Application No. 1909665 filed Sep. 3, 2019, the entire contents of each of which are hereby incorporated by reference.

BACKGROUND OF THE INVENTION

Field of the Invention

The present invention relates to an oscillating axle for a lifting device, a lifting device comprising such an axle, as well as a method of controlling such a lifting device.

Description of the Related Art

Lifting devices such as aerial work platforms may be equipped with oscillating axles, in particular as described in EP 1 414 733 or CN 104528609, making it possible to maintain contact with the ground on uneven terrain in order to preserve the stability of the machine. These oscillating axles comprise a bridge on which are mounted a wheel at each end, and jacks connecting the vehicle chassis and the bridge. The jacks may be double-acting: wherein in the nacelle displacement configuration with the lifting structure lowered, the translation of the jack is free in both directions allowing the axle to oscillate freely, while in the raised configuration, the position of the jacks is locked and the axle is blocked.

The jacks may also be of the single-acting type, which allows additional management compared to double-acting jacks (locking/unlocking of one or the other of the jacks and no longer both at the same time). In the raised platform translation mode, it thus becomes possible, in the event of an unfavorable change in chassis inclination, to allow the oscillation of the axle only in the stabilizing direction of the chassis (return to the 0° inclination position). This mode blocks oscillation in the aggravating direction and ensures permanent contact of the four wheels of the machine with the ground. The benefits are a much better adaptability of the machine to variations in terrain, as well as a significant reduction in the chassis counterweight since the four wheels are able to maintain permanent contact with the ground.

The jacks are blocked by trapping the hydraulic fluid from the jack control circuit by means of solenoid valves controlled by a machine control unit. In the event of an undetected failure of one of these solenoid valves, a jack may remain blocked in the ground travel configuration, causing a wheel to lose contact with the ground. In a lifting phase, the machine risks overturning if the load on the platform or the machine's center of gravity moves towards the wheel that is not supported on the ground.

It is these drawbacks that the invention intends to remedy by proposing a new oscillating axle that detects malfunctions that are potentially dangerous for the stability of the lifting device.

BRIEF SUMMARY OF THE INVENTION

To this end, the invention relates to an oscillating axle for a lifting device, wherein this axle comprises:
an axle bridge at the ends of which are mounted two ground links;
an oscillation axis;
a left jack and a right jack, each jack having a rod in contact with the bridge and a body fixed to a fixed part of a chassis of the lifting device, the body forming a chamber in which the rod moves,
a hydraulic circuit interconnecting the chambers of the left and right jacks, in which a fluid is present at a given pressure, making it possible to press the rods of the left jack and of the right jack against the bridge;
at least one solenoid valve on a branch of the hydraulic circuit connected to the chamber of the left jack, and at least one solenoid valve on a branch of the hydraulic circuit connected to the chamber of the right jack, wherein each of these solenoid valves may be positioned in an open position in which the fluid may flow freely, and a closed position in which the fluid is trapped in the chamber of the corresponding jack.

This axle is characterized in that each of the chambers of the left jack and of the right jack comprises a pressure sensor to measure the pressure of the fluid in each of the chambers, and in that control means are provided to detect a pressure in the one of the chambers that is greater than a first threshold, and/or a differential between the pressures in each of the chambers greater than a second threshold, so as to detect blockage of a solenoid valve in the closed position, and to initiate a safety procedure.

Thanks to the invention, the failure of a solenoid valve blocking a jack in position may be detected making it possible to initiate a safety procedure, and preventing the lifting device from being in an unstable situation during a lifting operation.

According to advantageous but not mandatory aspects of the invention, such an oscillating axle may incorporate one or more of the following characteristics, taken in any technically feasible combination:
  The control means are designed to send an alert signal to an operator or surroundings of the lifting device in the event that one of the pressure thresholds is exceeded.
  The control means are designed to inhibit certain functions of the lifting device.
  The pressures in the jack chambers are detected during a rolling phase of the lifting device and prior to a lifting phase of the lifting device.

The invention also relates to a lifting device comprising at least one oscillating axle as mentioned above.

The invention also relates to a method for controlling a lifting device comprising at least one oscillating axle, wherein this oscillating axle comprises:
an axle bridge with a wheel at each of its ends,
an oscillation axis,
a left jack and a right jack; each of the left and right jacks having a rod in contact with the bridge and a body fixed to a chassis of the lifting device, the body forming a chamber in which the rod moves;
a hydraulic circuit interconnecting the chambers of the left and right jacks, in which a fluid is present at a given pressure, making it possible to press the rods of the left jack and of the right jack against the bridge;
at least one solenoid valve on a branch of the hydraulic circuit connected to the chamber of the left jack, and at least one solenoid valve on a branch of the hydraulic circuit connected to the chamber of the right jack, wherein each of these solenoid valves may be positioned in an open position in which the fluid may flow freely, and a closed position in which the fluid is trapped in the chamber of the corresponding jack.

This method comprises a step a) consisting in measuring the pressure of the fluid in each of the chambers of the left jack and of the right jack, a step b) consisting in determining whether the pressure in one of the chambers is greater than a first threshold, and/or whether a differential between the pressures in each of the chambers is greater than a second threshold, thus signaling the blocking in the closed position of a solenoid valve, and c) initiating a safety procedure in the event of one case of the step b).

According to advantageous but not mandatory aspects of the invention, such a control method may incorporate one or more of the following characteristics, taken in any technically feasible combination:

Steps a) and b) are carried out during a rolling phase of the lifting device and prior to a lifting phase.

In step c), the safety procedure consists at least of: issuing an alert signal to an operator or surroundings of the lifting device, or inhibiting certain functions of the lifting device.

BRIEF DESCRIPTION OF THE DRAWINGS

The invention will be better understood and other advantages thereof will appear more clearly in the light of the following description of an oscillating axle of a lifting device and of a control method in accordance with its principle that are given by way of a non-limiting example with reference to the accompanying drawings in which.

DETAILED DESCRIPTION OF THE PREFERRED EMBODIMENTS

Figure 1:
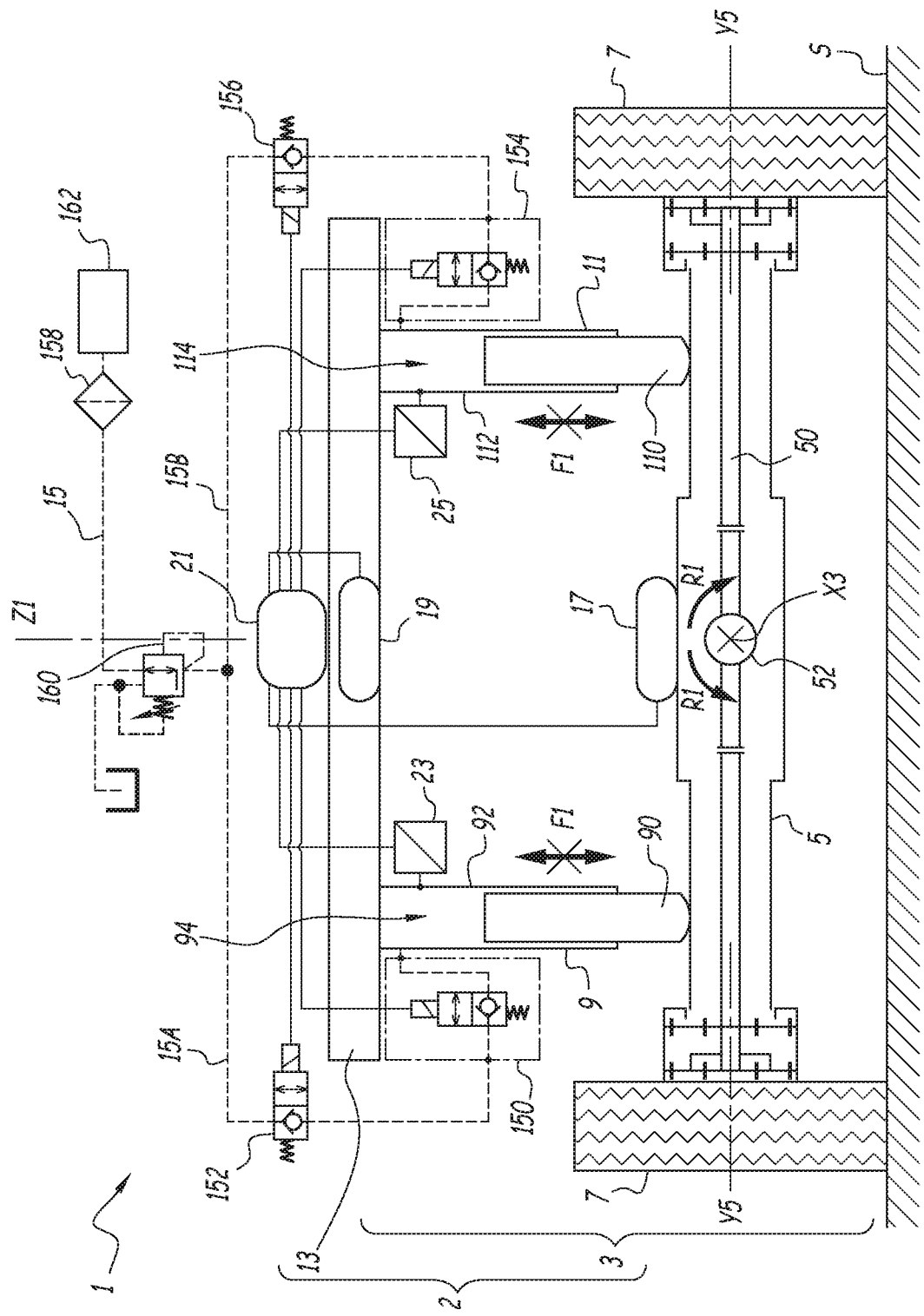
FIG. 1 is a schematic view of an oscillating axle according to the invention.
Figure 2:
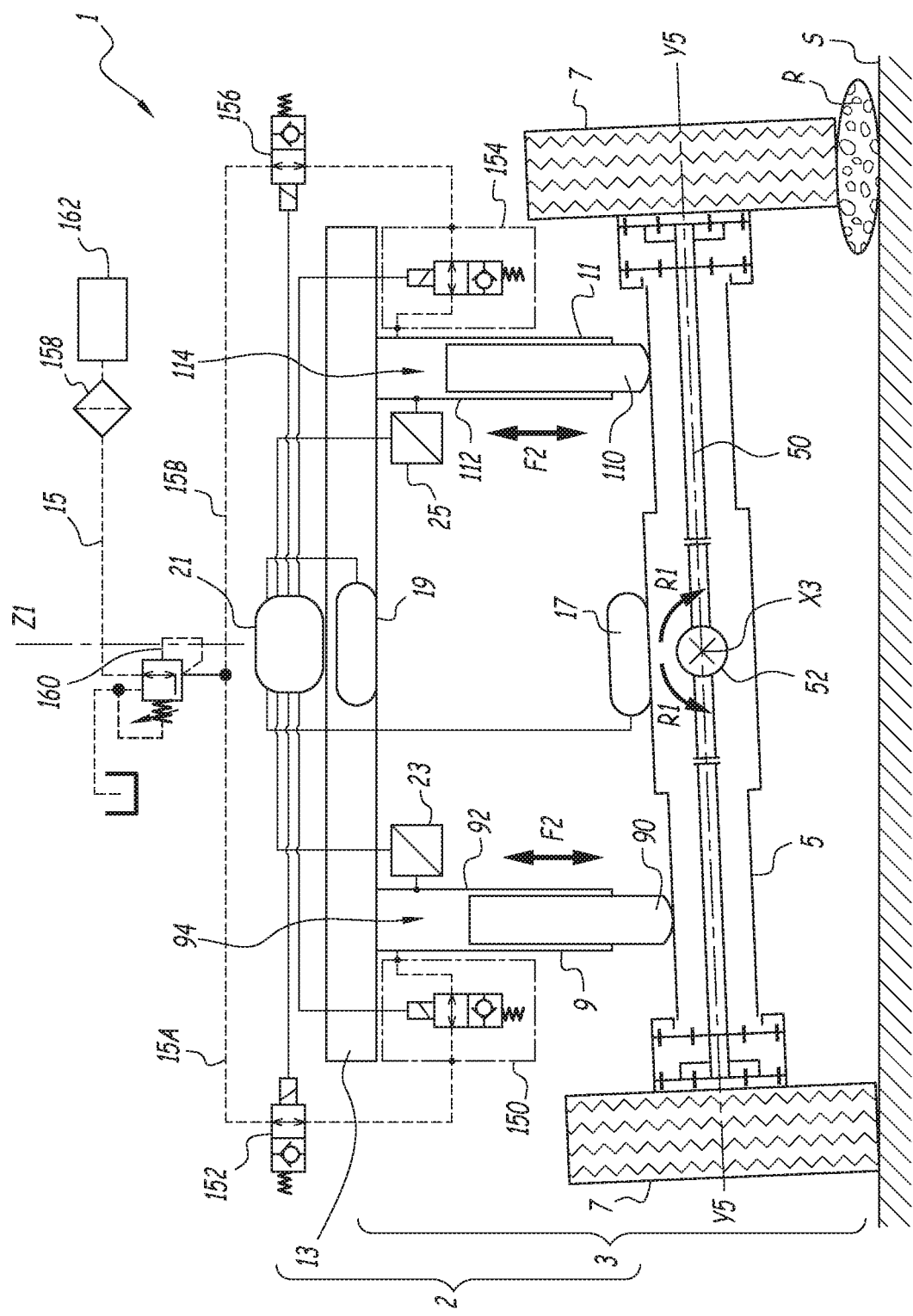
FIG. 2 is a schematic view of the oscillating axle of FIG. 1, in a configuration for driving on uneven ground.
Figure 3:
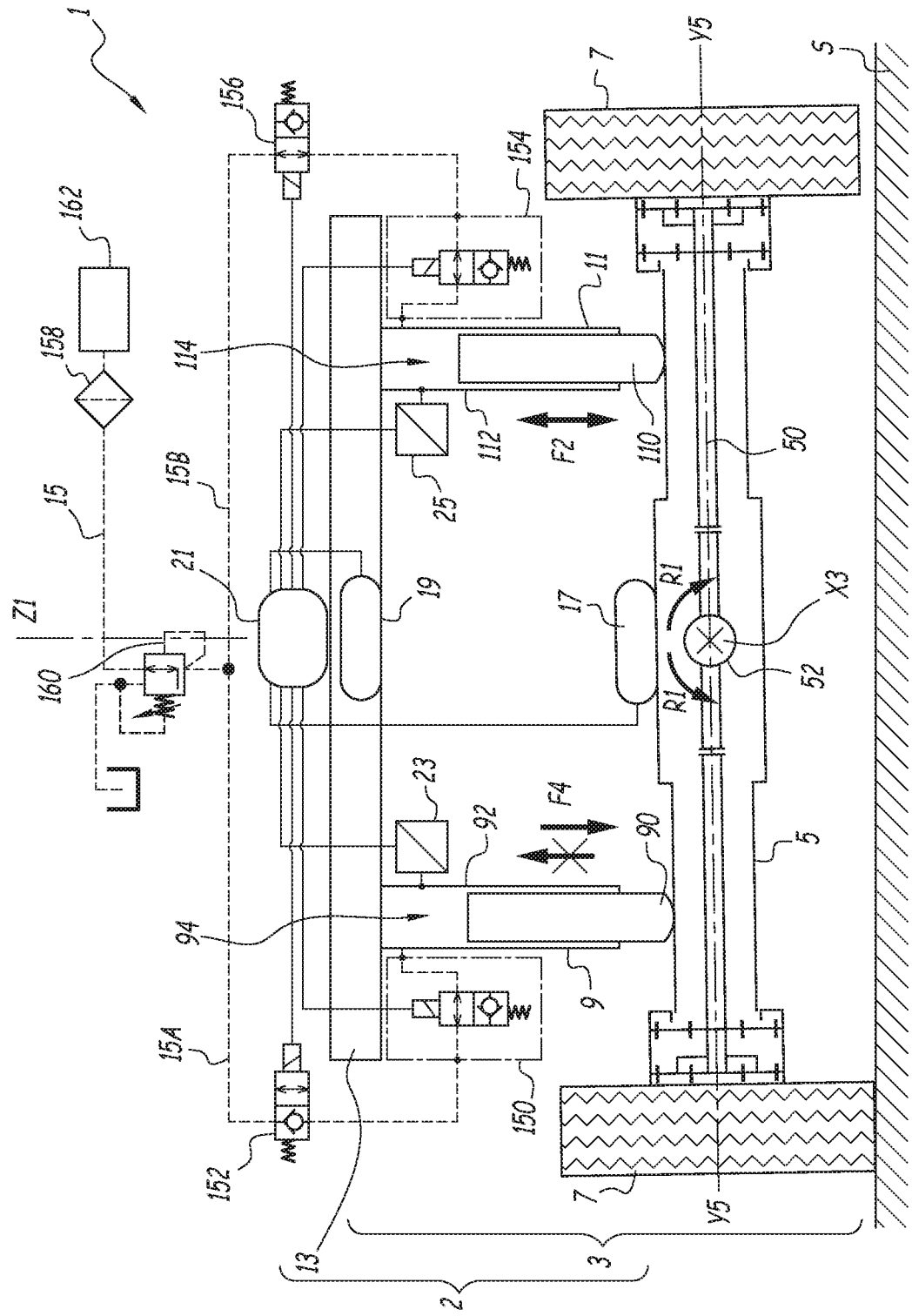
FIG. 3 is a schematic view of the oscillating axle of FIG. 1, in a failure configuration.

FIGS. 1 to 3 show a lifting device 1, such as a lifting platform, comprising a lower part comprising a chassis 2 and members connecting with the ground, and a lifting structure (not shown) supporting a platform (not shown). The lifting structure may be of the type comprising telescopic and articulated sections, or else of the "scissor" type.

In a conventional example, the lower part comprises four members connecting with the ground in the form of the wheels 7. The chassis 2 comprises a fixed part 13 and at least one oscillating axle, one of the latter of which is shown in FIG. 1 with the reference 3. The wheels 7 are mounted two by two on the axles. The fixed part 13 is fixed relative to a vertical axis Z1 of the lifting device 1.

The oscillating axle 3 comprises a bridge 5 having, at each of its ends, a wheel 7. The bridge 5 is a mechanical structure supporting the wheels 7, which includes a transmission shaft 50 to rotate the wheels 7 and which is also capable of modifying the orientation of the wheels 7 as part of a steering command of the machine 1.

The oscillating axle 3 may rotate about an axis X3 and is supported by an oscillation shaft 52 located at the center of the bridge 5. The axis X3 is perpendicular to the vertical axis of the vehicle 1 and perpendicular to a central axis Y5 of the bridge 5. When the bridge 5 oscillates relative to the fixed part 13, the axis Y5 pivots around the axis X3, as indicated by the arrows R1.

The oscillating axle 3 has two jacks, respectively a left jack 9 and a right jack 11, the function of which is to control the oscillation of the bridge 5 and to ensure the support of the wheels 7 on the ground S.

Each of the jacks 9 and 11 has a rod 90 and 110 in contact with the bridge 5 and a body 92 and 112 fixed on the fixed part 13 of the chassis 2. Each of the bodies 92 and 112 forms a chamber 94 and 114 in which the rod 90 or 110 moves.

The oscillating axle 3 comprises a hydraulic circuit 15 equipped with a filter 158 and a source 162 of pressurized fluid. The fluid supplied by the circuit 15 is maintained at constant pressure by means of a pressure reducer 160 upstream of branches 15A and 15B. The oil at constant pressure, called booster pressure, feeds the chambers 94 and 114 of the left jack 9 and of the right jack 11, and keeps the rods 90 and 110 pressed against the bridge 5.

The hydraulic circuit 15 comprises at least one solenoid valve 150 provided on a first branch 15A of the hydraulic circuit 15 connected to the chamber 94 of the left jack 9, and at least one solenoid valve 154 provided on a second branch 15B of the hydraulic circuit 15 connected to the chamber 114 of the right jack 11. Each of these solenoid valves 150 and 154 may be positioned in an open position (FIG. 2), in which the fluid may flow freely, and a closed position (FIG. 1), in which the fluid is trapped in the chamber 94 or 114 of the corresponding jack 9 or 11.

In FIG. 1, the solenoid valves 150 and 154 are in the closed position: the fluid may only enter the chambers 94 and 114 but cannot leave them. In FIG. 2, the solenoid valves 150 and 154 are in the open position: the fluid may freely enter or leave the chambers 94 and 114. The jacks 9 and 11 are single-acting.

According to an optional aspect, the branches 15A and 15B may each comprise an additional solenoid valve 152 or 156, the operation of which is synchronized with that of the solenoid valves 150 and 154. These additional solenoid valves 152 and 156 provide redundancy which increases the safety of the hydraulic circuit 15.

Each of the chambers 94 and 114 of the left jack 9 and of the right jack 11 comprises a respective pressure sensor 23 and 25 designed to measure the pressure of the fluid P9 or P11 in each of these chambers 94 and 114, while the oscillating axle 3 comprises control means connected to the pressure sensors 23 and 25. These control means are in the form, for example, of a control unit 21. The control unit 21 is designed to detect whether the pressure P9 or P11 in one of the chambers 94 and 114 is greater than a first threshold P1, and/or whether a differential ΔP between the pressures P9 and P11 in each of the chambers 94 and 114 is greater than a second threshold P2. If the pressure P9 or P11 is greater than P1 or if the differential ΔP is greater than P2, this indicates the blocking of one of the solenoid valves 150 and 154 in the closed position. In such a case, the control unit 21 is designed to initiate a safety procedure.

The control unit 21 is also connected to the solenoid valves 150, 152, 154 and 156 and exercises electrical control of these solenoid valves. The solenoid valves 150, 152, 154 and 156 are by default maintained in the closed position by springs. The electrical control exerted by the control unit 21 consists of supplying them with electric current to make them go into the open position.

The oscillating axle 3 also comprises an inclination sensor 17 fixed to the bridge 5 and an inclination sensor 19 fixed to the fixed part 13. The inclinations measured by the sensors 17 and 19 are communicated to the control unit 21 and indicate the inclination of the bridge 5 with respect to the fixed part 13.

The control unit 21 is designed to send an alert signal to an operator or the surroundings of the lifting device 1 if one of the thresholds P1 and P2 is exceeded. For example, the control unit 21 can control a sound system of the lifting device 1 so as to emit an alert signal in a platform with operators, or else sound systems on a lower part of the structure and intended for personnel nearby. The alert signal may also be in the form of an error message on a screen.

The control unit 21 is also designed to inhibit certain functions of the lifting device 1. For example, the control unit 21 is connected to a general controller (not shown) of the lifting device and may transmit control signals for the reduction of the attainable displacement speed or else signals for the reduction of the degree of displacement of certain sections of the lifting structure, or even totally inhibit lifting.

The oscillating axle 3, and, by extension, the lifting device 1, operate as follows.

In a first locked configuration shown in FIG. 1, the solenoid valves 150, 152, 154 and 156 are not energized. The solenoid valves are, therefore, in the closed position, and the fluid, therefore, cannot escape from the chambers 94 and 114. The jacks 9 and 11 are therefore blocked, as indicated by the barred double arrows F1 in FIG. 1, and the oscillating axle 3 is therefore locked.

The booster pressure is used in the hydraulic circuit 15 to keep the jacks 9 and 11 resting on the bridge 5. The solenoid valves are always open in the direction of supply to the jacks 9 and 11, whatever their state (supplied or not).

If the lifting device 1 moves on the ground with the axle 3 locked, the angle sensors 17 (axle) and 19 (chassis) do not change relative to each other, or always change in the same sense.

This locked configuration is suitable for parking or for the lifting phases of the lifting structure.

In a second "semi-locked" configuration, it is possible to allow the oscillation of the axle only in the stabilizing direction of the chassis (return to the 0° inclination position). The control unit 21 is thus able to separately control the solenoid valves 150/152 and 154/156 according to the data returned by the inclination sensors 17 and 19. The solenoid valves may then be closed to block one of the jacks 9 or 11 so that the inclination cannot be increased.

In a third unlocked configuration shown in FIG. 2, the solenoid valves are energized and are therefore open. The fluid may freely enter and leave the chambers 94 and 114: the jacks 9 and 11 are free to move, as shown by the double arrows F2 in FIG. 2. The oscillating axle 3 is therefore unlocked, which means that the axle is able to follow the irregularities of the ground, for example a rock R might cause an inclination of the bridge 5 with respect to the fixed part 13.

When moving over the ground with the axle unlocked, the measurements of the inclination sensors 17 and 19 change relative to each other.

The two chambers 94 and 114 are connected together at the same pressure. The sensors 23 and 25 indicate identical pressures P9 and P11 close to that used to fill the jacks 9 and 11.

In this configuration, the pressures P9 and P11 are analyzed by the control unit 21, for example during a rolling phase of the lifting device 1 and prior to raising the lifting structure.

In FIG. 3, a malfunction occurs in the unlocked configuration. The solenoid valves are normally energized and in the open position. However, the solenoid valve 152 remains blocked in the closed position (power supply fault or the valve remains blocked when, for example, too strong a torque is applied when mounting the solenoid valve in its cavity).

The fluid is then trapped in the chamber 94, and the jack 9 therefore remains blocked when the lifting device 1 is possibly on uneven ground, or else returns to regular ground after having encountered an irregularity. The axle 3 may only oscillate in one direction, which risks causing one of the wheels 7 to lose contact with the ground. In the case of FIG. 3, the orientation of the bridge 5 relative to the ground would require a clockwise rotation so that the right wheel might regain contact the ground. However, the jack 9 is blocked in the direction of retraction, as indicated by the upwards barred arrow F3. This clockwise rotation cannot take place and the right wheel remains raised, generating a loss of contact with the ground. The jack 9 may only extend downwards in the direction of the arrow F4, which would aggravate the imbalance. If the lifting device 1 were to stop at this time and begin a lifting phase, a danger of destabilization and overturning would arise.

In this case of failure, the pressure sensors 23 and 25 indicate the different pressures P9 and P11 during the displacement phase. The sensor 23 will, in particular, measure a pressure P9 greater than the booster pressure normally measured, because the fluid trapped in the chamber 94 can no longer escape and the pressure increases under the effect of the force exerted by the bridge 5 on the rod 90 to make it enter the chamber 94. The failure is therefore detected either by the pressure P9 being greater than the first threshold P1, or by the pressure differential ΔP exceeding the second threshold P2. By way of example, the pressure threshold P1 may be equal to 25 bar, while the pressure differential threshold P2 may be, by way of example, equal to 15 bar. The pressure threshold P1 may be dependent on the booster pressure. More generally, the pressure threshold P1 is necessarily greater than the booster pressure, for example set at the booster pressure of +10 bar.

The control unit 21 may also measure the time during which the crossing of the threshold occurs. For example, if the exceeding of the threshold does not exceed a duration of 25 ms, then this overshoot need not be taken into account.

This detection of a failure makes it possible to ensure the correct operation of the oscillating axle 3 during the displacement phase prior to a lifting phase. If an anomaly is detected during the displacement phase, then raising on the wheels is prohibited and a fault is reported to the operator as well as in the machine diagnostics. Thus, the failure is detected and reported before it might lead to dangerous consequences.

The invention claimed is:

1. An oscillating axle for a lifting device, wherein this axle comprises:
   an axle bridge at the ends of which are mounted two members contacting the ground;
   an axis of oscillation;
   a left jack and a right jack, each jack having a rod in contact with the bridge and a body fixed on a fixed part of a chassis of the lifting device, wherein the body forms a chamber in which the rod moves;
   a hydraulic circuit interconnecting the chambers of the left jack and right jack, in which a fluid is present at a given pressure, making it possible to press the rods of the left jack and right jack against the bridge;
   at least one solenoid valve on a branch of the hydraulic circuit connected to the chamber of the left jack, and at least one solenoid valve on a branch of the hydraulic circuit connected to the chamber of the right jack, each of these solenoid valves being able to be positioned in an open position, in which the fluid circulates freely, and a closed position, in which the fluid is trapped in the chamber of the corresponding jack, wherein each of the chambers of the left jack and of the right jack comprises a pressure sensor designed to measure the pressure of the fluid in each of the chambers, and wherein control means are provided to initiate a security procedure when the control means detect that one of the solenoid valves is blocked in the closed positon by determining whether the pressure in one of the chambers is greater than a first pressure threshold and/or whether a differential pressure between the respective pressures in the chambers is greater than a second pressure threshold.

2. The oscillating axle according to claim 1, wherein the control means are designed to emit an alert signal to an operator or the surroundings of the lifting device in the event of exceeding one of the first and second pressure thresholds.

3. The oscillating axle according to claim 1, wherein the control means are designed to inhibit certain functions of the lifting device.

4. The oscillating axle according to claim 1, wherein any blocking of one of the solenoid valves is detected during a rolling phase of the lifting device and prior to a lifting phase of the lifting device.

5. A method for controlling a lifting device comprising at least one oscillating axle, wherein this oscillating axle comprises:
- an axle bridge having a wheel at each of its ends;
- an axis of oscillation;
- a left jack and a right jack; each of the left and right jacks having a rod in contact with the bridge and a body fixed on a chassis of the lifting device, the body forming a chamber in which the rod moves;
- a hydraulic circuit interconnecting the chambers of the left and right jacks, in which a fluid is present at a given pressure, making it possible to press the rods of the left jack and right jack against the bridge;
- at least one solenoid valve on a branch of the hydraulic circuit connected to the chamber of the left jack, and at least one solenoid valve on a branch of the hydraulic circuit connected to the chamber of the right jack, each of these solenoid valves being able to be positioned in an open position, in which the fluid circulates freely, and a closed position, in which the fluid is trapped in the chamber of the corresponding jack, wherein the method comprises a step a) consisting in measuring the pressure of the fluid in each of the chambers of the left jack and of the right jack, a step b) consisting in detecting that one of the solenoid valves is blocked in the closed positon by determining whether the pressure in one of the chambers is greater than a first threshold and/or whether a differential pressure between the respective pressures in the chambers is greater than a second threshold, and a step c) consisting in initiating a safety procedure in the event of one of the cases of step b) occurring.

6. The method according to claim 5, wherein the steps a) and b) are carried out during a rolling phase of the lifting device and prior to a lifting phase of the lifting device.

7. The method according to claim 5, wherein in step c), the safety procedure consists at least in: transmitting an alert signal to an operator or the surroundings of the lifting device, or inhibiting certain functions of the lifting device.

* * * * *